(12) United States Patent
Da Palma et al.

(10) Patent No.: US 8,731,925 B2
(45) Date of Patent: May 20, 2014

(54) SOLUTION THAT INTEGRATES VOICE ENROLLMENT WITH OTHER TYPES OF RECOGNITION OPERATIONS PERFORMED BY A SPEECH RECOGNITION ENGINE USING A LAYERED GRAMMAR STACK

(75) Inventors: William V. Da Palma, Coconut Creek, FL (US); Brien H. Muschett, Palm Beach Gardens, FL (US)

(73) Assignee: Nuance Communications, Inc., Burlington, MA (US)

( * ) Notice: Subject to any disclaimer, the term of this patent is extended or adjusted under 35 U.S.C. 154(b) by 1503 days.

(21) Appl. No.: 11/615,900

(22) Filed: Dec. 22, 2006

(65) Prior Publication Data

US 2008/0154596 A1    Jun. 26, 2008

(51) Int. Cl.
G10L 15/06    (2013.01)
G10L 15/28    (2013.01)
G10L 17/00    (2013.01)

(52) U.S. Cl.
USPC ........................................... 704/251; 704/246

(58) Field of Classification Search
USPC ......... 704/231, 233, 236, 246–248, 251–255, 704/270–271, 275, E17.001–E17.016, 704/E15.001–E15.05, E11.001–E11.007
See application file for complete search history.

(56) References Cited

U.S. PATENT DOCUMENTS

| | | | | |
|---|---|---|---|---|
| 5,222,187 A | * | 6/1993 | Doddington et al. | 704/200 |
| 5,583,965 A | * | 12/1996 | Douma et al. | 704/275 |
| 5,719,921 A | * | 2/1998 | Vysotsky et al. | 379/88.01 |
| 5,732,187 A | * | 3/1998 | Scruggs et al. | 704/251 |
| 6,058,363 A | * | 5/2000 | Ramalingam | 704/251 |
| 6,061,654 A | * | 5/2000 | Brown et al. | 704/275 |
| 6,073,101 A | * | 6/2000 | Maes | 704/275 |
| 6,163,768 A | | 12/2000 | Sherwood et al. | |
| 6,182,039 B1 | * | 1/2001 | Rigazio et al. | 704/257 |
| 6,212,498 B1 | | 4/2001 | Sherwood et al. | |
| 6,377,924 B1 | * | 4/2002 | Gong et al. | 704/256.4 |
| 6,424,943 B1 | | 7/2002 | Sherwood et al. | |
| 6,456,970 B1 | * | 9/2002 | Kao | 704/256.8 |
| 6,601,027 B1 | * | 7/2003 | Wright et al. | 704/235 |
| 6,839,669 B1 | * | 1/2005 | Gould et al. | 704/246 |
| 6,901,360 B1 | * | 5/2005 | Dymetman et al. | 704/2 |
| 6,912,498 B2 | | 6/2005 | Stevens et al. | |

(Continued)

OTHER PUBLICATIONS

Young, S.R., et al., "High Level Knowledge Sources in Usable Speech Recognition Systems", Communications of the ACM, pp. 183-194, vol. 32, No. 2, Feb. 1989.

(Continued)

*Primary Examiner* — Pierre-Louis Desir
*Assistant Examiner* — David Kovacek
(74) *Attorney, Agent, or Firm* — Wolf, Greenfield & Sacks, P.C.

(57) ABSTRACT

The present invention can include a speech enrollment system including an ordered stack of grammars and a recognition engine. The ordered stack of grammars can include an application grammars layer, a confusable grammar layer, a personal grammar layer, a phrase enrolled grammar layer, and an enrollment grammar layer. The recognition engine can return recognition results for speech input by processing the input using the ordered stack of grammars. The processing can occur from the topmost layer in the stack to the bottommost layer in the stack. Each layer in the stack can includes exit criteria based upon a defined condition. When the exit criteria is satisfied, a result can be returned based upon that layer and lower layers of the ordered stack can be ignored.

21 Claims, 2 Drawing Sheets

(56) References Cited

U.S. PATENT DOCUMENTS

| | | | |
|---|---|---|---|
| 7,013,276 B2* | 3/2006 | Bickley et al. | 704/255 |
| 7,031,918 B2 | 4/2006 | Hwang | |
| 7,130,800 B1* | 10/2006 | Currey et al. | 704/273 |
| 7,191,133 B1* | 3/2007 | Pettay | 704/270 |
| 7,302,383 B2* | 11/2007 | Valles | 704/9 |
| 7,363,229 B2* | 4/2008 | Falcon et al. | 704/275 |
| 7,400,712 B2* | 7/2008 | August | 379/88.01 |
| 7,457,397 B1* | 11/2008 | Saylor et al. | 379/88.17 |
| 2002/0013701 A1* | 1/2002 | Oliver et al. | 704/231 |
| 2002/0138265 A1* | 9/2002 | Stevens et al. | 704/251 |
| 2002/0198719 A1* | 12/2002 | Gergic et al. | 704/270.1 |
| 2003/0069729 A1* | 4/2003 | Bickley et al. | 704/236 |
| 2003/0101054 A1* | 5/2003 | Davis et al. | 704/235 |
| 2003/0115289 A1* | 6/2003 | Chinn et al. | 709/219 |
| 2003/0125944 A1* | 7/2003 | Wohlsen et al. | 704/246 |
| 2004/0193426 A1* | 9/2004 | Maddux et al. | 704/275 |
| 2006/0047510 A1 | 3/2006 | Ativanichayaphong et al. | |
| 2006/0200350 A1* | 9/2006 | Attwater et al. | 704/251 |
| 2006/0277032 A1* | 12/2006 | Hernandez-Abrego et al. | 704/9 |
| 2006/0282267 A1* | 12/2006 | Lopez-Barquilla et al. | 704/257 |
| 2007/0106934 A1* | 5/2007 | Muschett et al. | 715/513 |
| 2007/0118358 A1* | 5/2007 | Tom | 704/10 |
| 2007/0250317 A1* | 10/2007 | Davis et al. | 704/235 |
| 2008/0115192 A1* | 5/2008 | Kulkarni et al. | 726/2 |
| 2008/0154596 A1* | 6/2008 | Da Palma et al. | 704/246 |
| 2008/0154599 A1* | 6/2008 | Muschett et al. | 704/250 |
| 2008/0243517 A1* | 10/2008 | Muschett et al. | 704/275 |

OTHER PUBLICATIONS

Liu, F-H., et al., "Efficient cepstral normalization for robust speech recognition", Proceedings of the Workshop on Human Language Technology, pp. 69-74, 1993.

Gorniak, P., et al., "Probabilistic Grounding of Situated Speech using Plan Recognition and Reference Resolution", Proceedings of the 7th Int'l. Conference on Multimodal Interfaces, pp. 138-143, 2005.

Tomko, S., et al., "Towards Efficient Human Machine Speech Communication: The Speech Graffiti Project", ACM Trans. on Speech and Language Processing, vol. 2, No. 1, Art. 2, Feb. 2005.

* cited by examiner

Comparision/Action 200

| Grammar matched | Result score | Result in |
|---|---|---|
| Layer 1 application (MRCP RECOGNIZE) | score >= confidence-threshold | Turn terminates with all results which score >= threshold up to the nbest specified by client being reported. Phrase is not enrolled during this turn. Client receives a Recognition Result NLSML. |
| Layer 2 confusable (clash detection) | 1-score >= clash-threshold | Turn terminates. Results have matched the application grammar with low score, but high enough according to clash threshold. Client receives an enrollment result containing a clash phrase. |
| Layer 3 personal (clash detection) | 1-score >= clash-threshold | Turn terminates and client receives an enrollment result containing a clash phrase. |
|  | 1-score < clash-threshold | Result match ignored, since score is below clash threshold. Audio may be acceptable for enrollment as long it is consistent with previous turn or has a good transcription. Check for consistency or terminate with a consistent enrollment result (first turn) |
| Layer 4 phrase (consistency detection) | score >= consistency-threshold | Report a consistent enrollment result. Add input to the phrase grammar. Turn terminates. |
|  | score < consistency-threshold | Report an inconsistent enrollment result. |
| Layer 5 base forms (acoustic base forms service) | score >= 50 | Good transcription. Choose best transcription (s) to report and add them to the phrase grammar. Turn terminates. |
|  | Score < 50 | Bad transcription/poor quality audio - Turn terminates. |

FIG. 2

SOLUTION THAT INTEGRATES VOICE ENROLLMENT WITH OTHER TYPES OF RECOGNITION OPERATIONS PERFORMED BY A SPEECH RECOGNITION ENGINE USING A LAYERED GRAMMAR STACK

BACKGROUND

1. Field of the Invention

The present invention relates to the field of speech recognition systems and, more particularly, to a solution that integrates voice enrollment with other recognition grammars using a layered grammar stack.

2. Description of the Related Art

Voice enrollment permits users to dynamically add phrases to a voice enrolled grammar at runtime. A user provided, enrolled phrase is typically added to a special dynamic grammar (e.g., a voice enrolled grammar) which may contain other user provided phrases. During enrollment, a user typically is required to repeat a new phrase multiple times until a level of consistency is achieved. Voice enrollment is generally handled by a separate component/entity/process from that used for other (i.e., non-enrollment) types of speech recognition. For example, voice enrollment functionality provided by a speech processing system is often accessed via a special application program interface (API) that provides access to voice enrollment functionality.

In other words, a conventionally implemented speech processing system supporting voice enrollment has a normal decoding path and a separate path for voice enrollment. This results in additional overhead for voice enrollment specific functions and also results in a potential for differing recognition results. For example, a voice enrollment component/entity/process can return one result set and a general speech recognition component/entity/process can return a different result set for the same input. Differing recognition results are presently handled using phonetic distance tables, which are used to perform phonetic comparison for similarity and confusability. Because of the added overhead involved for supporting voice enrollment in a conventional speech recognition system, performance can degrade and/or relatively large quantities of computing resources can be consumed in the process of enrolling user phrases.

SUMMARY OF THE INVENTION

The present invention discloses a solution that integrates voice enrollment with other types of recognition through a use of a layered grammar stack. Specifically, the invention discloses a layered grammar stack, which permits a turn based speech recognition engine to handle speech recognize input using normal application grammars, to enroll user provided phrases, to perform clash detection, to perform consistency determinations, and to evaluate acoustic base form quality for enrollment purposes. All of these functions can be performed using a common decoding path and can be performed in a single turn.

The present invention can be implemented in accordance with numerous aspects consistent with material presented herein. For example, one aspect of the present solution can include a method for creating voice-enrolled grammars. In the method, speech input can be received. Entries in an application grammar can be used to determine whether the speech input matches an entry in the application grammar with a sufficient confidence. If so, a result can be returned that indicates a recognition match. If not, entries in an application grammar and/or a personal grammar can be used to determine whether the speech input matches an entry in the application grammar with a sufficient clash value. If so, a result that indicates a clash with an existing grammar entry can be returned. If not, a voice enrollment consistency detection operation can be performed. Depending upon results of the consistency detection operation, the speech input can be voice enrolled to generate an acoustic base form corresponding to the speech input. Also, an audio quality of transcription can be determined. Enrollment of the speech input can depend upon a quality of the transcription.

Another aspect of the present invention can include a method of utilizing a layered grammar stack to integrate voice enrollment operations with other types of recognition operations of a speech recognition engine. In the method, an ordered stack of grammars can be established, wherein a topmost layer in the stack includes at least one application grammar and wherein the bottommost layer in the stack includes an enrollment grammar. Speech input can be received. The speech input can be processed with a speech recognizing engine that utilizes the ordered stack. The processing can occur from the topmost layer in the stack to the bottommost layer in the stack. Each layer in the stack can include exit criteria based upon a defined condition (e.g., a confidence threshold, a clash threshold, a consistency threshold, and an audio quality). When the exit criteria is satisfied, a speech recognition result is returned based upon that layer is processing. Lower layers of the ordered stack can then be ignored.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 2 is a table of comparison conditions for each layer in a grammar stack and action to be taken dependent upon comparison results.

DETAILED DESCRIPTION OF THE INVENTION

Figure 1:
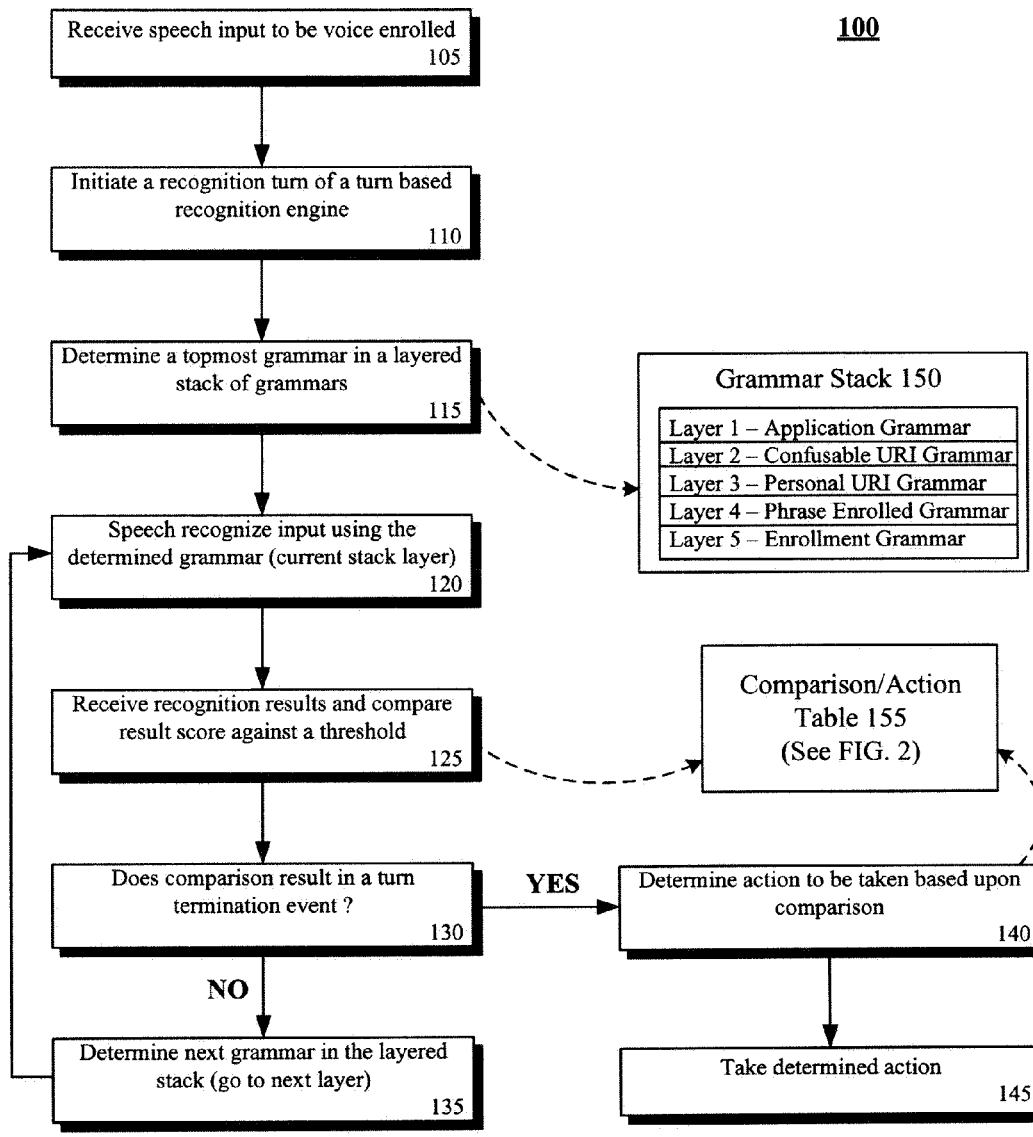
FIG. 1 is a flow chart of a method for performing voice enrollment operations using a layered grammar stack in accordance with an embodiment of the inventive arrangements disclosed herein

FIG. 1 is a flow chart of a method 100 for performing voice enrollment operations using a layered grammar stack in accordance with an embodiment of the inventive arrangements disclosed herein. As shown, the grammar stack 150 is a five layered stack that includes: layer one—application grammar; layer two—confusable grammar; layer three—personal grammar; layer four—a phrase enrolled grammar, and layer five—an enrollment grammar.

The application grammars of layer one can include application specific voice commands. The confusable grammar of layer two can use layer one grammar entries for clash detection purposes. That is, commands acoustically similar to application commands of grammar one should not be permitted to be voice enrolled, due to potential recognition ambiguities. The personal grammars of layer three can also be utilized for clash detection purposes. A new enrollment entry should not be acoustically confusing with a pre-existing entry already included in a personal grammar. The phrase grammars of layer 4 can be used for consistency detection for voice enrolled phrases. The enrollment grammars of layer 5 can be system base form grammars that represent a set of phonemes that are used to generate a lexicon for recognizing utterances. Layer 5 can be used when determining if input audio quality is sufficient for voice enrollment.

Table 155 is shown in detail as table 200 of FIG. 2. Table 155/200 can be used to determine actions to be taken when a recognition engine matches a particular layer in the grammar stack. Actions indicated by table 155/200 can use application provided "tuning know" values used in standard speech recognition (i.e., confidence levels, an nbest list, and the like). Taking actions (155/200) based upon results of speech recognizing input using the grammar stack 150 can provide in a single recognition turn command recognition, clash detection, consistency determination, and acoustic base form generation. That is, method 100 (which uses grammar stack 150 and table 155/200) leverages capabilities of a speaker-independent recognition system to generate acoustic base forms and at the same time determine if input audio is unique within the voice enrolled grammar, consistent with previous utterance, and/or non-confusing with other entries. These steps are all performed using a core functionality and decoding path of a recognition engine that include normal (or non-voice enrolled) recognition grammars.

Method 100 can begin in step 105, where speech input to be enrolled can be received. In step 110, a recognition turn of a turn based recognition engine can be initiated. In step 115, the topmost grammar in the layered stack (150) of grammars can be determined. The top layer (e.g., layer 1) can include application provided grammars, which includes application specific voice commands.

In step 120, the speech input of step 105 can be recognized using the determined grammar (i.e., the application grammars). In step 125, recognition results can be received. Scores of these results (e.g., result scores) can be compared against confidence thresholds or other values (i.e., clash thresholds, consistency thresholds, and/or quality thresholds). In step 130, the method can check whether the comparison of step 125 results in a turn termination event, which can be determined using logic expressed table 155. When no turn termination event occurs, the method can proceed to step 135, where the next grammar in the stack can be determined (e.g., layer 2). The method can loop from step 135 to step 120, where the speech input of step 105 can be recognized using the determined grammar (e.g., layer 2 or confusable grammar).

When the comparison results of step 130 (based upon table 155) results in a turn termination event, the method can proceed from step 130 to step 140, where an appropriate programmatic action (indicated in table 155) can be determined. In step 145, the determined action can execute. The method can loop from step 145 to step 105, where new speech can be received.

It should be appreciated that the processing of the various layers in the ordered stack can occur in parallel, even though results obtained from lower stack layers can be ignored depending upon results achieved by higher levels of the ordered stack.

It should be apparent from stack 150 that the first layer of the stack 150 can be used for command matching, the second and third layers for clash detection, the forth for consistency detection, and the fifth for assessing acoustic base form quality. More specifically and as shown in table 155/200, in layer one, when a result score is greater than or equal to a confidence threshold, a recognition turn can terminate with all results that score greater than or equal to the threshold up to the nbest results being returned. A phrase is not enrolled when this occurs.

In layer two and layer three, when a result score is greater than or equal to a clash threshold, the tern can terminate. In this situation, return results can match entries in a grammar with a low score that is high enough according to the clash threshold. An enrollment result can be returned that includes a clash phrase. A phrase is not enrolled. When the result score is less than the clash threshold, a result match can be ignored since the score is below the clash threshold. Received speech input may be suitable for enrollment as long as it is consistent with a previous turn or has a good transcription.

In layer four, a result score can be compared against a consistency threshold. When consistent, the speech input can be enrolled. Otherwise, layer five can be checked for a good transcription. A good transcription is indicated (for example only) as having an acoustic quality result score greater than or equal to a value of fifty. If the transcription is good, the best available transcription(s) can be used for voice enrollment. Otherwise, audio quality of the speech input can be too poor for enrollment to continue and the recognition turn can end with no enrollment occurring.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A computer system for enabling use of a single voice recognition engine for both command recognition and user speech enrollment, said computer system comprising:
    a user interface to receive speech input, the speech input comprising at least a portion of a phrase desired to be added to a voice-enrolled grammar;
    at least one processor; and a computer-readable medium encoded with at least one computer program for performing enrollment and recognition by applying speech input to a turn-based speech recognition engine in one turn that, when executed by the at least one processor, controls the computer system to:

process the speech input during a speech recognition turn beginning at a first layer of an ordered stack of grammars, wherein the stack comprises a higher layer, the higher layer comprising an application grammar, a lower layer, the lower layer comprising the enrollment grammar; and a layer between the higher layer and the lower layer comprising a confusable grammar layer, and each layer in the stack includes an exit criterion;

wherein the processing in one turn is progressively performed from the higher layer in the stack toward the lower layer in the stack, until a given layer in the stack is reached at which the exit criterion is met;

in response to determining that the exit criterion for the given layer is satisfied, end the speech recognition turn, return a speech recognition result based upon the given layer, and ignore any lower layers of the ordered stack, wherein the processing comprises conditionally adding the at least a portion of the phrase to the voice-enrolled grammar based on the processing completing for the lower layer of the stack without satisfying an exit criterion for any layer of the stack for which processing was performed.

2. The system of claim 1, wherein the ordered stack includes a personal grammar layer ordered below the confusable grammar layer and a phrase enrolled grammar layer ordered below the personal grammar layer, and wherein the phrase enrolled grammar layer is ordered above the lower layer.

3. The system of claim 1, wherein the processing of the speech input using the ordered stack provides command recognition, clash detection, consistency determination, and acoustic base form generation.

4. The system of claim 1, wherein the exit criterion for each layer is based upon comparing a recognition matching score against at least one of a confidence threshold, a clash threshold, a consistency threshold, and a quality threshold.

5. The system of claim 1, wherein processing of the speech input using the ordered stack occurs in a single recognition turn.

6. A method for creating voice-enrolled grammars comprising:

receiving speech input, the speech input comprising at least a portion of a phrase desired to be added to a voice-enrolled grammar;

using entries in an application grammar and at least one processor to determine whether the speech input matches an entry in the application grammar with a sufficient confidence;

when a sufficient confidence is determined, returning a result that indicates a recognition match;

when an insufficient confidence is determined, using entries in at least one of an application grammar and a personal grammar to determine whether the speech input matches an entry in the application grammar with a sufficient clash value;

when a sufficient clash value is determined, returning a result that indicates a clash with an existing grammar entry;

when an insufficient clash value is determined, performing a voice enrollment consistency detection operation for determining acoustic quality; and if the voice enrollment consistency detection operation indicates a sufficient level of consistency, voice enrolling the speech input by adding the at least a portion of the phrase to the voice-enrolled grammar, thereby rejecting the speech input if the speech input is recognized by the application grammar, or if the speech input is confusable with an entry in either the application grammar or the user grammar, or if the acoustic quality of the speech input is inadequate for matching, wherein the above steps are performed by a turn based speech recognition engine in a single turn; and wherein the method utilizes an ordered stack of grammars consisting of a higher layer, a lower layer, and a layer between the higher layer and the lower layer, wherein the higher layer comprises the application grammar, the lower layer comprises the voice-enrolled grammar, and the layer between the higher layer and the lower layer comprises a confusable grammar layer, wherein the layers of the ordered stack are processed in order from the topmost layer in the stack to the bottommost layer in the stack, wherein each layer in the stack includes an exit criterion based upon a defined condition, such that when the exit criterion is satisfied, a result is returned based upon that layer, and lower layers of the ordered stack are ignored.

7. The method of claim 6, wherein the ordered stack includes a personal grammar layer ordered below the confusable grammar layer and a phrase enrolled grammar layer ordered below the personal grammar layer.

8. The method of claim 6, wherein the steps of claim 6 are performed automatically by at least one machine in accordance with at least one computer program having a plurality of code sections that are executable by the at least one machine.

9. The method of claim 6, wherein adding the at least a portion of the phrase to the voice-enrolled grammar involves generating an acoustic base form corresponding to the speech input.

10. A method of utilizing a layered grammar stack to integrate voice enrollment operations with other types of recognition operations of a speech recognition engine comprising:

establishing an ordered stack of grammars comprising a higher layer, a lower layer, and a layer between the higher layer and the lower layer, each layer including an exit criterion, wherein the higher layer in the stack includes at least one application grammar, the lower layer in the stack includes an enrollment grammar, and the layer between the higher layer and the lower layer includes a confusable grammar layer, the enrollment grammar comprising a mapping of speech inputs to user-defined phrases, the enrollment grammar for allowing a user to define a set of speech recognition commands, the application grammar comprising a mapping of speech inputs to a plurality of application-specific voice commands;

receiving speech input, the speech input comprising at least a portion of a phrase desired to be added to a voice-enrolled grammar; and processing the speech input during a speech recognition turn beginning at a first layer of the ordered stack of grammars, wherein the processing in one turn is progressively performed from the topmost layer in the stack to the bottommost layer in the stack, until a given layer in the stack is reached at which the exit criterion is met;

in response to determining that the exit criterion is satisfied, ending the speech recognition turn, returning a speech recognition result based upon the given layer, and ignoring lower layers of the ordered stack, wherein the processing comprises conditionally adding the at least a portion of the phrase to the voice-enrolled grammar based on the processing completing for the lower layer of the stack without satisfying an exit criterion for any layer of the stack for which processing was performed.

11. The method of claim 10, wherein the ordered stack includes a personal grammar layer ordered below the confusable grammar layer and a phrase enrolled grammar ordered below the personal grammar, and wherein the phrase enrolled grammar is ordered above the lower layer.

12. The method of claim 10, wherein the speech input is processed with a turn based speech recognition engine, and wherein the processing of the ordered stack occurs in a single turn, regardless of the layer of the stack which returns results.

13. The method of claim 10, wherein the processing of the ordered stack provides command recognition, clash detection, consistency determination, and acoustic base form generation.

14. The method of claim 10, wherein the confusable grammar layer compares a recognition result score obtained from the application grammar against a clash threshold and, when the result score is greater or equal to the clash threshold, the processing step does not continue to lower layers of the ordered stack and a clash indication is returned.

15. The method of claim 10, wherein the ordered stack includes a personal grammar layer for which the processing step compares a recognition result score obtained from a personal grammar against a clash threshold and, when the result score is greater or equal to the clash threshold, the processing step does not continue to lower layers of the ordered stack and a clash indication is returned.

16. The method of claim 10, wherein the ordered stack includes a phrase enrolled grammar layer for which the processing step compares a recognition result score obtained from a personal grammar against a consistency threshold and, when the result score is greater or equal to the consistency threshold, consistent enrollment results are reported.

17. The method of claim 10, wherein the steps of claim 11 are performed automatically by at least one machine in accordance with at least one computer program having a plurality of code sections that are executable by the at least one machine.

18. The method of claim 10, wherein processing the speech input using the ordered stack occurs in a single recognition turn.

19. The method of claim 10, wherein the higher layer is the topmost layer, and wherein the lower layer is the bottommost layer.

20. The method of claim 19, wherein the processing step of the topmost layer for the application grammar compares a recognition result score against a confidence threshold, and when the result score is greater or equal to the confidence threshold, the processing step does not continue to lower layers of the ordered stack and a recognition result is returned.

21. The method of claim 19, wherein the processing step of the bottommost layer for the enrollment grammar compares an audible quality received against a quality value and selectively enrolls the speech input depending upon comparison results.

* * * * *